United States Patent [19]
Ball et al.

[11] Patent Number: 5,487,558
[45] Date of Patent: Jan. 30, 1996

[54] INSTRUMENT PANEL IN A MOTOR VEHICLE

[75] Inventors: Johannes Ball, Jockgrim; Wolfgang Henseler, Herrenberg; Uwe Gerstenberg, Kandel; Thomas Fischer, Calw-Stammheim, all of Germany

[73] Assignee: Mercedes-Benz AG, Stuttgart, Germany

[21] Appl. No.: 314,648

[22] Filed: Sep. 29, 1994

[30] Foreign Application Priority Data

Sep. 29, 1993 [DE] Germany .......................... 43 33 135.1
May 27, 1994 [DE] Germany .......................... 44 18 582.0

[51] Int. Cl.⁶ .................................................. B60R 21/16
[52] U.S. Cl. ........................................ 280/728.3; 280/732
[58] Field of Search ................................ 280/728.3, 732

[56] References Cited

U.S. PATENT DOCUMENTS 5,035,444  7/1991  Carter .................................. 280/728.3

FOREIGN PATENT DOCUMENTS

| 465869 | 1/1992 | European Pat. Off. . |
| 1909519 | 10/1964 | Germany . |
| 4137926 | 5/1992 | Germany . |
| 4311241C1 | 4/1994 | Germany . |
| 5185894 | 7/1993 | Japan . |
| WO92/09458 | 6/1992 | WIPO . |

*Primary Examiner*—Kenneth R. Rice
*Attorney, Agent, or Firm*—Evenson, McKeown, Edwards & Lenahan

[57] ABSTRACT

The instrument panel in a motor vehicle exhibits an interior, rigid reinforcement panel, a foamed-plastic layer located thereabove and an outer skin which covers said layer. A cover which likewise exhibits this construction is integrated into the instrument panel in front of an airbag unit, which cover, in the event of a crash, can move away and releases an opening through which an airbag can unfold out of its receiving container behind the instrument panel. The reinforcement portion of the cover is a separated-off part of the adjoining reinforcement-panel surface. The process for producing an instrument panel of this type is carried out such that, before or after foaming of the entire reinforcement panel, the opening cover is separated from said panel.

6 Claims, 1 Drawing Sheet

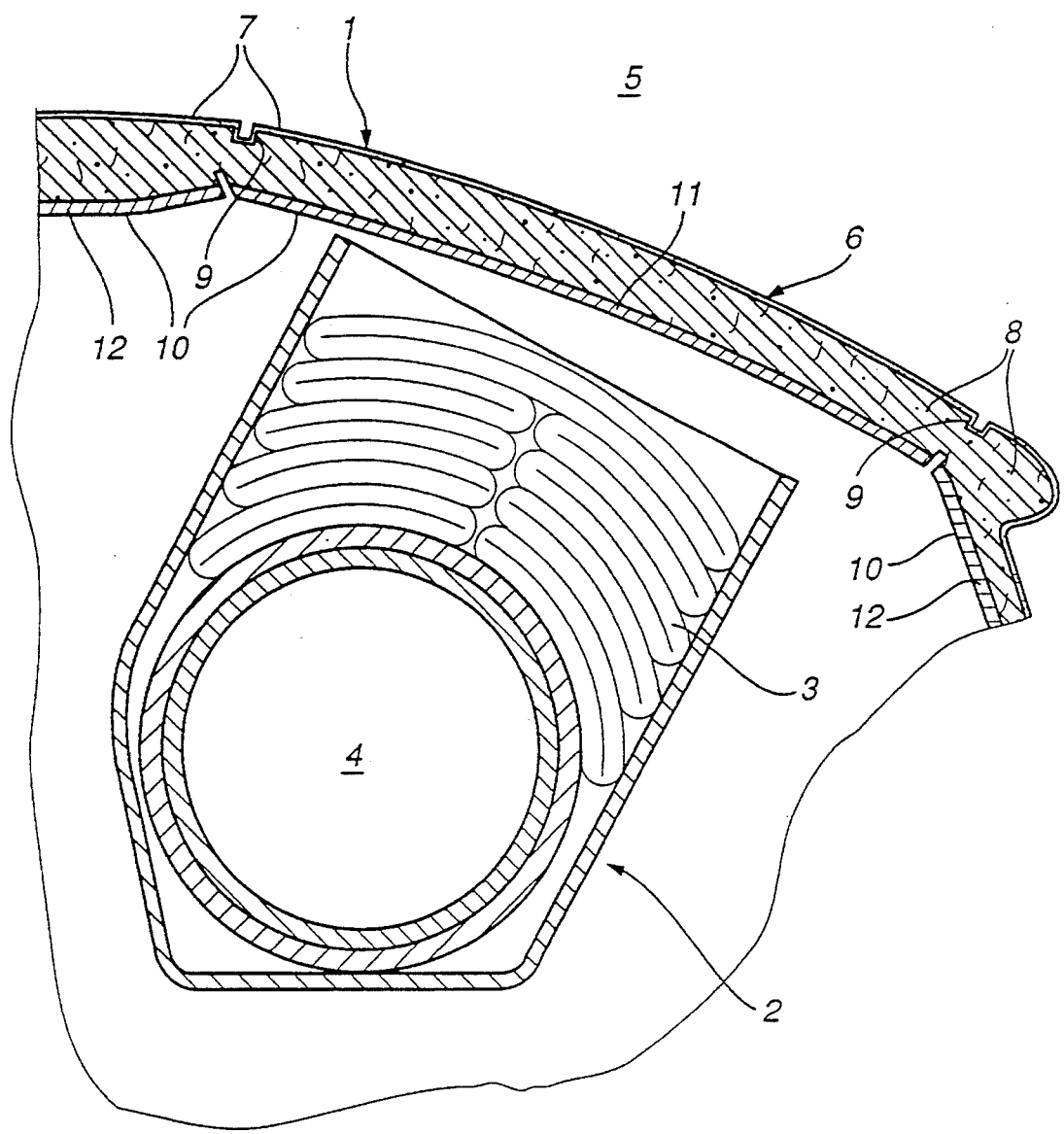

INSTRUMENT PANEL IN A MOTOR VEHICLE

BACKGROUND AND SUMMARY OF THE INVENTION

The invention relates to an instrument panel arrangement in a motor vehicle including an interior rigid reinforcement panel, a foamed-plastic layer located above the reinforcement panel, an outer skin which covers said foamed-plastic layer, a cover section integrated into the instrument panel for covering an airbag unit, said cover section exhibiting a similar reinforcement panel, foamed-plastic layer, and outer skin as the adjacent panel European Patent Document EP 0 465 869 A1 discloses an instrument panel in a motor vehicle, which is made up of three layers located one above the other. Located on the inside is a rigid reinforcement panel, by means of which the shape of the instrument panel is predetermined, upon which there is located foamed-plastic layer and, above this, an outer skin which is visible in the passenger compartment of the vehicle. Integrated into the instrument panel is a cover which is moved away in the event of a crash by an unfolding airbag pressing against it. In the covering position, the cover lies level or flush with the surrounding instrument-panel surface. The cover also exhibits a panel-like reinforcement beneath the foamed-plastic layer which is designed as a separate part, and is fitted into an opening of the reinforcement panel of the surrounding instrument panel.

An object of the invention is to produce an instrument panel of the above noted type in a more cost-effective manner.

This object is achieved according to preferred embodiments of the invention by providing an arrangement wherein the cover section is configured to move away and release an opening through which an airbag can unfold out of a receiving container of the airbag unit behind the instrument panel, and wherein the rigid reinforcement panel of the cover is a separated-off part of the adjoining rigid reinforcement panel structure.

The instrument panel in the case of which the reinforcement portion of the cover for the airbag unit is separated out from the surrounding reinforcement panel results in simple manufacturing of the instrument panel. Consequently, the instrument panel can be produced complete with reinforcement panel, foamed-plastic layer and covering outer skin, whereafter, for the first time, the reinforcement portion of the cover can be partially or completely separated out by machining or by laser cutting without thereby breaking through the foamed-plastic layer, for which reason the cover would not then be visible, in the closed position, from the passenger compartment of the vehicle. Up until the last machining operation for the variant with cover, the production of the instrument panel thus remains the same for vehicles with and without a gas bag installation. Moreover, no special moulds are necessary for foaming an instrument panel with cover.

If the reinforcement portion of the cover is separated off before foaming, there is the advantage, in comparison with a separately manufactured part which is subsequently inserted, that use can be made of the material which is removed for the opening, and said cover can be produced by a simple manufacturing procedure, e.g., punching, usually simultaneously with the border trimming of the entire reinforcement panel.

Other objects, advantages and novel features of the present invention will become apparent from the following detailed description of the invention when considered in conjunction with the accompanying drawings.

BRIEF DESCRIPTION OF THE DRAWINGS

The single drawing figure is a sectional schematic view showing an airbag assembly behind an instrument panel constructed according to a preferred embodiment of the invention.

DETAILED DESCRIPTION OF THE PREFERRED EMBODIMENTS

The figure shows, in a section from the side, an instrument panel 1 in a motor vehicle (not shown in any more detail) in the region of an airbag unit 2 which is located behind the instrument panel 1 and whose folded-in airbag 3 is filled by a gas generator 4 in the event of a crash, only shown in outline here, and unfolds in the direction of a vehicle occupant. For this purpose the airbag 3, when it unfolds in the direction of the passenger compartment 5 of the vehicle, presses against the instrument panel 1 from behind.

The instrument panel 1 exhibits a cover section 6 which is forced away and releases an opening for the unfolding airbag 3 when it is inflated. The cover section 6 is integrated into the surrounding structure and surface of the instrument panel 1 and exhibits an outer skin 7 facing towards the passenger compartment 5 of the vehicle, which outer skin is produced in one piece with the surrounding instrument-panel surface. Located beneath the outer skin 7, in the complete instrument panel 1, is a foamed-plastic layer 8 which is weakened, at the fracture point of the cover section 6 which is provided, by partial or encircling incisions 9.

The impact-energy-absorbing foamed-plastic layer 8 and its outer skin 7 are supported in the desired form by a reinforcement panel 10. The reinforcement panel 10 is formed in one piece, whereafter the reinforcement portion 11 of the cover section 6 is separated off from the surrounding reinforcement-panel surface 12 either before or after roaming with the foamed-plastic layer 8. Separating off the reinforcement portion 11 after foaming, e.g., by machining or by laser cutting offers the advantage that, up until this separating-off procedure, the instrument panel 1 is manufactured in the same way for a vehicle with or without an airbag unit 2 and is thus also foamed in the same mould.

Separating off the reinforcement portion 11 before foaming can be achieved in a simple manner, e.g., by punching out according to other contemplated embodiments. In order that the foam does not enter the resulting reinforcement-panel opening, said previously separated-off reinforcement portion 11 is then, for foaming purposes, fixed releasably on the surrounding reinforcement-panel surface 12 by clips or the like.

It is advantageous if the reinforcement portion 11 of the cover section 6 is separated off with a cut at an angle which is other than perpendicular with respect to the extent of the cover (see the drawing figure) since, consequently, the loadability of the instrument panel 1 when an occupant subjects the instrument-panel surface to normal loading, is increased in comparison with a perpendicular cut.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Instrument panel arrangement in a motor vehicle comprising:

an interior rigid reinforcement panel, a foamed-plastic layer located above the reinforcement panel, an outer skin which covers said foamed-plastic layer, a cover section integrated into the instrument panel for covering an airbag unit, said cover section exhibiting a similar reinforcement panel, foamed-plastic layer, and outer skin as the adjacent instrument panel arrangement, wherein the cover section is configured to move away and release an opening through which an airbag can unfold out of a receiving container of the airbag unit behind the instrument panel, and wherein the similar reinforcement panel of the cover section is an adjoining part of said reinforcement panel separated from said reinforcement panel via cuts formed at an angle other than perpendicular to a plane of the reinforcement panel.

2. Process for producing an instrument panel arrangement in a motor vehicle comprising:

an interior rigid reinforcement panel, a foamed-plastic layer located above the reinforcement panel, an outer skin which covers said foamed-plastic layer, a cover section integrated into the instrument panel for covering an airbag unit, said cover section exhibiting a similar reinforcement panel foamed-plastic layer and outer skin as the adjacent instrument panel structure, wherein the cover section is configured to move away and release an opening through which an airbag can unfold out of a receiving container of the airbag unit behind the instrument panel, and wherein the rigid reinforcement panel of the cover is a separated-off part of adjoining rigid reinforcement panel structure, said method comprising the steps of:

forming the interior rigid reinforcement panel in one piece; and separating the rigid reinforcement panel of the cover section from the surrounding reinforcement panel structure formed in one piece by providing angled cuts other than perpendicular with respect to a plane of said reinforcement panel.

3. Process according to claim 2, wherein the reinforcement portion of the cover is separated out from the reinforcement-panel surface before foaming of the entire reinforcement panel and, for the purposes of foaming, is releasably connected to said surface.

4. Process according to claim 2, wherein said separating is done prior to applying the foamed-plastic layer.

5. Process according to claim 3, comprising releasably connecting the rigid reinforcement panel of the cover section adjacent rigid reinforcement panel structure during application of foam to form the foamed-plastic layer.

6. Process according to claim 2, wherein said separating is done after applying the foamed-plastic layer.

* * * * *